Jan. 14, 1930.　　　　F. P. RYDER　　　　1,743,240
MACHINE FOR SEPARATING STRING BEANS FROM STALKS, ETC
Filed April 23, 1928　　　2 Sheets-Sheet 1

Inventor
FRANK PITTIS RYDER,
By A. P. Grully
Attorney

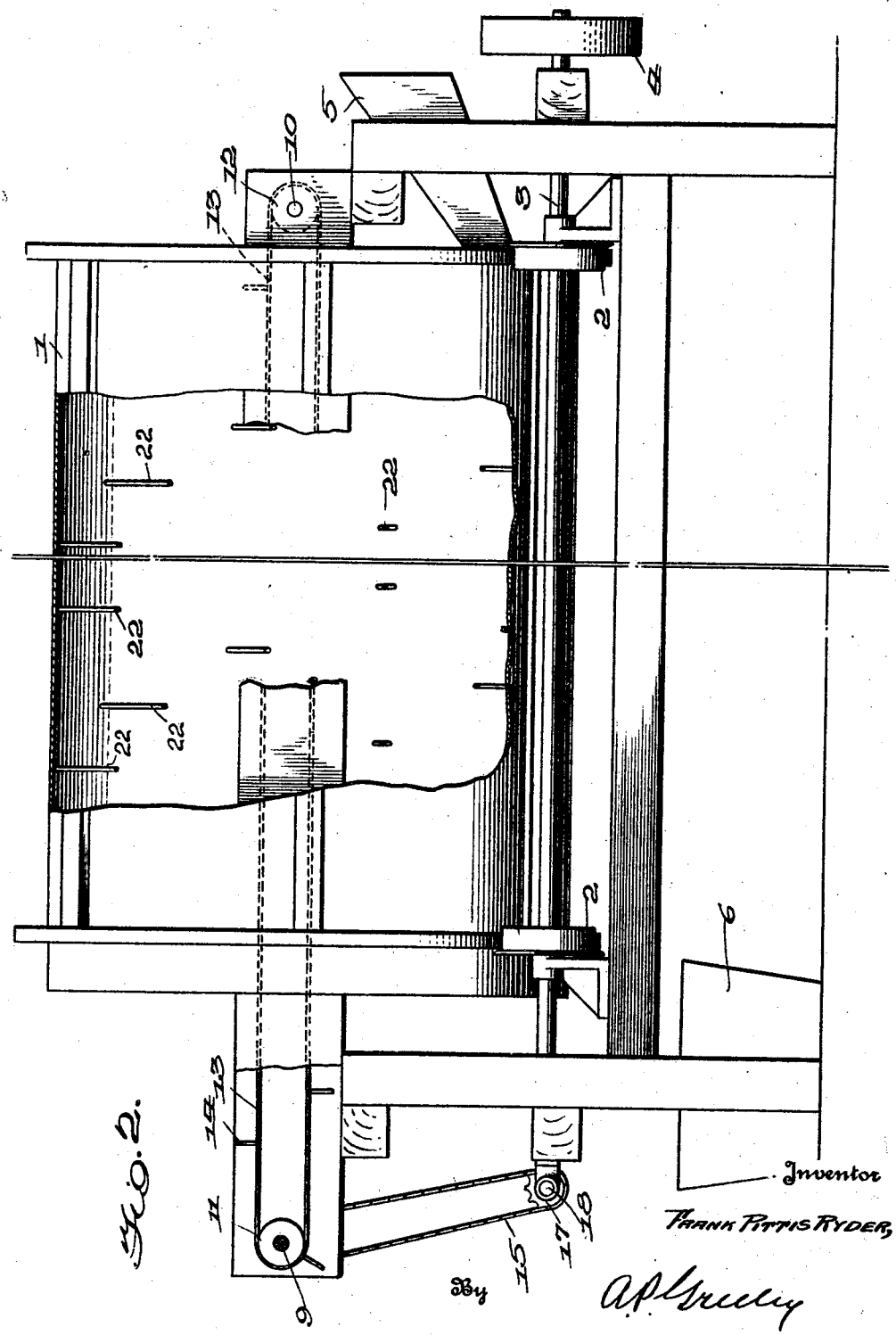

Patented Jan. 14, 1930

1,743,240

UNITED STATES PATENT OFFICE

FRANK P. RYDER, OF NIAGARA FALLS, NEW YORK

MACHINE FOR SEPARATING STRING BEANS FROM STALKS, ETC.

Application filed April 23, 1928. Serial No. 272,298.

My invention relates to devices for separating string beans from the stalks, leaves and other portions of the bushes which may be mixed with them.

In an application for Letters Patent of the United States filed by me November 9, 1927, Serial No. 232,119, I have described a machine for stripping string beans from the bushes on which they are grown and while the machine therein described separates leaves and stalks to a considerable extent from the beans, particularly leaves which are detached from the stalks, more or less of the stalks, with or without attached leaves, are delivered from the machine with the beans. It is the object of my present invention to devise a machine which will receive the mingled beans and stalks as discharged from the machine of my said application and so separate the stalks and other portions of the bushes or vines from the beans that the beans will be practically ready for the snipping of their ends preparatory to canning.

With the object above indicated in view and other objects hereinafter explained in view, my invention consists in the construction and combination of elements hereinafter described and claimed.

Referring to the drawings:—

Figure 2 is a side view of the same partly broken away.

Figure 1:
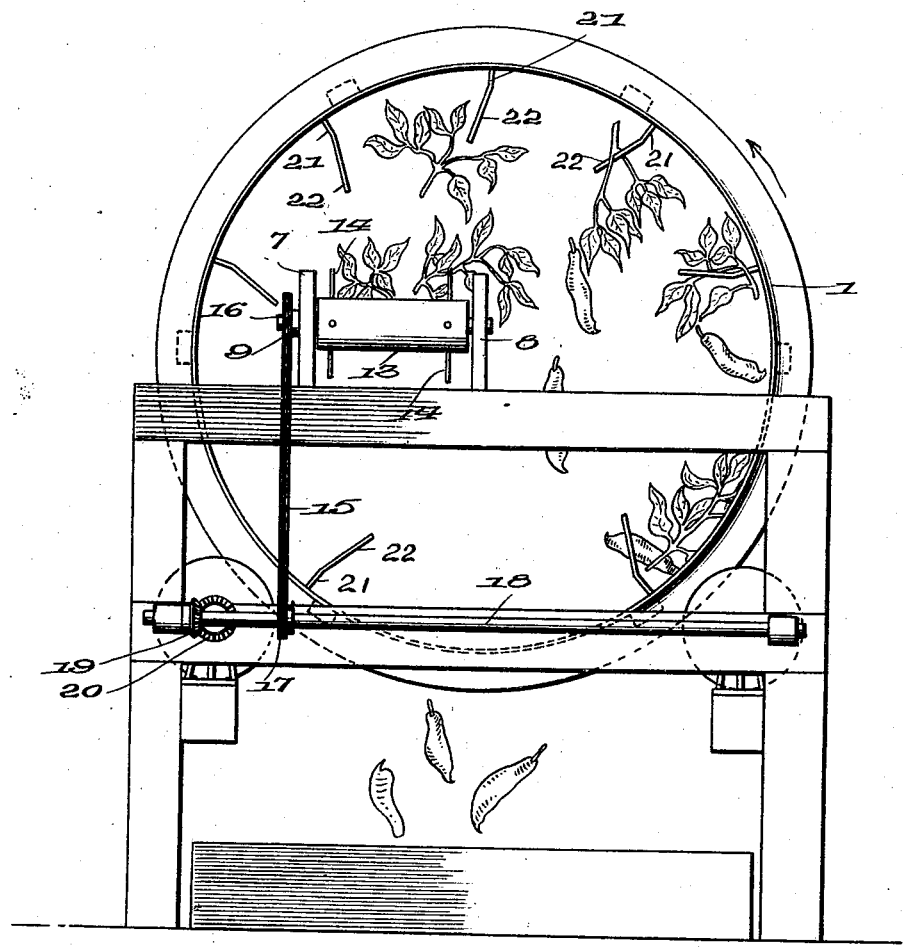
Figure 1 is a rear end view of a machine embodying my invention.

In the drawings 1 indicates a cylinder carried on travelers 2, 2, of which travelers 2 are carried on a shaft 3 which is rotated by driving means applied to pulley 4 to thereby cause cylinder 1 to rotate in the direction indicated by the arrow in Figure 1. The cylinder 1 is open at both ends and a delivery chute 5 is arranged at the inlet or receiving end to supply the string beans and portions of the bushes or vines on which they were grown and from which they have been stripped by any convenient means as by the devices shown in my application for bean harvester, filed November 9, 1927. Serial No. 232,119. The cylinder being open at the other end the string beans are free to fall from it into a suitable receptacle 6.

Extending through the interior of the cylinder are parallel side members 7, 8, having suitable bearings near their ends for shafts 9 and 10 on which are mounted rollers 11 and 12 respectively on which is carried an endless belt 13 provided at suitable intervals with pins 14. Shaft 9 is positively driven in any convenient manner as by sprocket chain 15 connecting sprocket wheel 16 on shaft 9 with sprocket wheel 17 on cross shaft 18 which through bevel gears 19, 20, is driven by shaft 3. The side members 7, 8, are so located that the belt 13 will be wholly to one side of the axis of cylinder 1.

Extending inward from the inner periphery of cylinder 1 are pins 21 having their inner end portions 22 bent out of a radial line and in the direction in which they are moved by rotation of the cylinder so that these pins act upon the portions of bean bushes or vines during a portion of their movement somewhat as hooks. These pins 21 are arranged in successive rows from end to end of the cylinder, the pins of one row being staggered with reference to the adjacent row.

In operation, the cylinder being rotated in the direction indicated by the arrow in Figure 1 and bean pods and portions of the bushes or vines, in the mixture as it comes from the machine shown in my application 232,119, above referred to, being supplied by feed chute 5, the inner end portions 22 of pins 21 engage the portions of the bushes or vines which are usually branched and carry them upward until they pass the vertical plane of the axis of the cylinder from which point they slide off the pins and fall onto belt 13 to be engaged by pins 14 and carried out through the delivery end of cylinder 1 to fall off the belt as it passes over roller 15.

The string beans being relatively heavy and free from branches or projections readily caught by pins 21 fall to the bottom of the cylinder and, the axis of the cylinder being inclined towards the delivery end are moved along by gravity and fall out of the delivery end into receptacle 6. If the pods are so engaged by pins 21 as to be carried upward by them they fall off before they are carried past the vertical plane of the axis of the cylinder.

While the machine above described is particularly adapted and intended for separation of stalks or other portions of the bushes or vines from the bean pods it may be used for separation of other articles having relatively light weight and more or less branching from articles having relatively great weight and not having branches or other projections adapted to be engaged by pins 21.

Having thus described my invention what I claim is:

1. In a machine for separting string beans from stalks and leaves, a cylinder open at both ends, pins extending inward from the cylinder, means for rotating the cylinder and means within the cylinder arranged to move longitudinally thereof adapted to receive stalks or other material from said pins and to remove the material so received from the cylinder.

2. In a machine for separating string beans from stalks and leaves, a cylinder open at both ends, pins extending inward from the cylinder having their inner ends bent in the direction of rotation of the cylinder, means for rotating the cylinder and means within the cylinder arranged to move longitudinally thereof, adapted to receive stalks or other material from said pins and to remove the material so received from the cylinder.

3. In a machine for separating string beans from stalks and leaves, a cylinder open at both ends, pins extending inward from the cylinder arranged in rows at right angles to the axis of the cylinder, means for rotating the cylinder and means within the cylinder arranged to move longitudinally thereof, adapted to receive stalks or other material from said pins and to remove the material so received from the cylinder.

4. In a machine for separating string beans from stalks and leaves, a cylinder open at both ends, pins extending inward from the cylinder arranged in rows at right angles to the axis of the cylinder, the pins of adjacent rows being staggered, means for rotating the cylinder and means within the cylinder arranged to move longitudinally thereof adapted to receive stalks or other material from said pins and to remove the material so received from the cylinder.

5. In a machine for separating string beans from stalks and leaves, a cylinder open at both ends arranged to rotate on an axis inclined to the horizontal, pins extending inward from the cylinder, means for rotating the cylinder and means within the cylinder arranged to move longitudinally thereof, adapted to receive stalks or other material from said pins and to remove the material so received from the cylinder.

6. In a machine for separating string beans from stalks and leaves, a cylinder open at both ends, pins extending inward from the cylinder, means for rotating the cylinder and means within the cylinder above and out of contact with its lower portion and arranged to move longitudinally of the cylinder adapted to receive stalks or other material from said pins and to remove the material so received from the cylinder.

7. In a machine for separating string beans from stalks and leaves, a cylinder open at both ends, pins extending inward from the cylinder, means for rotating the cylinder and means within the cylinder arranged above the axis thereof having movement longitudinally of the cylinder adapted to receive stalks or other material from said pins and to remove the material so received from the cylinder.

8. In a machine for separating string beans from stalks and leaves, a cylinder open at both ends, pins extending inward from the cylinder, means for rotating the cylinder and means within the cylinder adapted to receive stalks or other material from said pins and to remove the material so received from the cylinder, comprising an endless belt provided with pins adapted to engage said material.

9. In a machine for separating string beans from stalks and leaves, a cylinder open at both ends, pins extending inward from the cylinder, means for rotating the cylinder and means adapted to receive stalks or other material from said pins and to remove the material so received from the cylinder comprising an endless belt provided with pins adapted to engage said material arranged within the cylinder out of the path of movement of the ends of the pins carried by the cylinder.

10. In a machine for separating string beans from stalks and leaves, a cylinder open at both ends having its axis inclined to the horizontal, pins extending inward from the cylinder, means for rotating the cylinder, means within the cylinder adapted to receive stalks or other material from said pins and to remove the material so received from the cylinder, and means for feeding beans mixed with stalks and leaves to the cylinder.

In testimony whereof, I hereunto affix my signature.

FRANK P. RYDER.